United States Patent [19]

Makami et al.

[11] Patent Number: 4,478,895
[45] Date of Patent: Oct. 23, 1984

[54] METHOD OF MANUFACTURE OF SILICONE ELASTOMER COATED CLOTH

[75] Inventors: Ryuzo Makami; Akito Nakamura, both of Ichihara, Japan

[73] Assignee: Toray Silicone Co., Ltd., Tokyo, Japan

[21] Appl. No.: 573,539

[22] Filed: Jan. 25, 1984

[51] Int. Cl.³ .............................................. B05D 3/02
[52] U.S. Cl. ................................. 427/407.3; 427/409; 427/412
[58] Field of Search .................. 427/407.3, 407.1, 412, 427/407.2, 409, 389.8

[56] References Cited

U.S. PATENT DOCUMENTS

| | | | |
|---|---|---|---|
| 2,608,499 | 8/1952 | Straka | 427/407.3 X |
| 3,079,281 | 2/1963 | Dexter et al. | 427/407.3 X |
| 3,373,049 | 3/1968 | Nitzsche et al. | 427/407.3 X |
| 3,759,740 | 9/1973 | Campbell | 427/389.8 |
| 4,303,712 | 12/1981 | Woodroof | 428/58 |
| 4,419,402 | 12/1983 | Gutek | 428/266 |
| 4,421,581 | 12/1983 | Olsen | 156/71 |

FOREIGN PATENT DOCUMENTS

| | | | |
|---|---|---|---|
| 2687 | 2/1967 | Japan . | |
| 53-048001 | 4/1978 | Japan | 427/407.3 |
| 5985 | 1/1982 | Japan . | |
| 1299941 | 12/1972 | United Kingdom | 427/407.3 |

Primary Examiner—Thurman K. Page
Attorney, Agent, or Firm—Edward C. Elliott

[57] ABSTRACT

A method of preparing a silicone elastomer coated cloth having a surface coating of silicone resin is described. The coated cloth is elastic and pliable with a surface which has superior dirt resistance. The cloth is first coated with an addition-reaction-curing silicone elastomer composition which uses a platinum system catalyst or with an organic peroxide-curing silicone elastomer composition. The uncured elastomer layer is then coated with a silicone resin composition of the addition-reaction-curing type which uses a platinum system catalyst and has a molar ratio of organic groups to silicon atoms of 0.8 to 1.8. The silicone elastomer composition layer and the silicone resin composition layer are then heat cured simultaneously.

12 Claims, 2 Drawing Figures

METHOD OF MANUFACTURE OF SILICONE ELASTOMER COATED CLOTH

BACKGROUND OF THE INVENTION

Field of the Invention

The present invention relates to a silicone elastomer-coated cloth.

Information Pertaining to the Invention

Silicone elastomer coated cloths have been used for some time as electrical insulative materials, diaphragms, sealing materials and duct hoses. Their use as medical materials and garment materials has also been proposed, see Japanese Patents No. Sho 42[1967]-2687 and No. Sho 55[1980]-152863, the latter equivalent to U.S. Pat. No. 4,303,712, filed Dec. 1, 1981 by Woodroof. Japanese Kokai No. Sho 57[1982]5985, published Jan. 12, 1982, by Miura, Shimizu, and Hosokawa discloses a silicone coated fabric that has a coating of silicone resin on at least one surface to prevent the adhesion of dust to the coated fabric surface. The coated fabric is prepared by coating the fabric with silicone elastomer, curing the elastomer, then coating the cured elastomer surface with silicone resin and curing the resin.

U.S. Pat. No. 4,419,402, issued Dec. 6, 1983, to Gutek teaches the use of translucent polyorganosiloxane resin compositions coated upon translucent substrates for use in the exterior portions of buildings intended to be heated at least in part by solar energy.

Conventionally, polytetrafluoroethylene-coated glass cloth and polyvinyl chloride-coated synthetic fiber textiles have been used for such purposes.

However, polytetrafluoroethylene-coated glass cloth is expensive and has the drawbacks of poor pliability and bending resistance. Polyvinyl chloride-coated synthetic fiber textiles have the disadvantages of lacking weather resistance and having poor pliability at low temperatures.

A coated cloth with excellent pliability, bending resistance and weather resistance could be obtained if silicone elastomer were used instead of polytetrafluoroethylene and polyvinyl chloride, but the problem is that it readily becomes dirty through absorbing dust and other debris when used for long periods outdoors and in dusty places. If silicone resin were used instead of polytetrafluoroethylene and polyvinyl chloride, it would be resistant to dirt but the pliability and bending resistance would be sacrifice.

Therefore, the inventors achieved the present invention as a result of earnest studies aimed at developing a silicone elastomer-coated cloth with superior dirt resistance, pliability, and bending resistance.

SUMMARY OF THE INVENTION

The present invention relates to a method of preparing a silicone elastomer-coated cloth having a layer of silicone resin coated over the silicone elastomer coated cloth. The cloth is coated with an addition-reaction-curing silicone elastomer composition which uses a platinum system catalyst or with an organic peroxide-curing silicone elastomer composition. The uncured elastomer layer is then coated with a silicone resin composition of the addition-reaction-curing type which uses a platinum system catalyst and has a molar ratio of organic groups to silicon atoms of 0.8 to 1.8. The silicone elastomer composition layer and the silicone resin composition layer are heat cured simultaneously.

It is an object of this invention to disclose a method of producing a silicone elastomer coated cloth which is elastic and pliable and also having a surface which has superior dirt resistance.

DESCRIPTION OF THE INVENTION

The present invention relates to a method of manufacturing a silicone elastomer-coated cloth having a layer of silicone resin over the silicone elastomer consisting essentially of coating a cloth with silicone elastomer composition of a type selected from the group consisting of addition-reaction-curing type using a platinum catalyst and an organic peroxide-curing type, after which a silicone resin composition of the addition-reaction-curing type using a platinum catalyst and having a molar ratio of organic groups to silicon atoms of 0.8 to 1.8 is coated over the surface of the silicone elastomer composition and then the said silicone elastomer composition and the said silicone resin composition are simultaneously heat cured.

Figure 1:
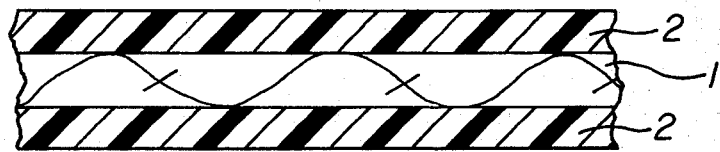
FIG. 1 is a cross-section of conventional silicone elastomer coated cloth.
Figure 2:
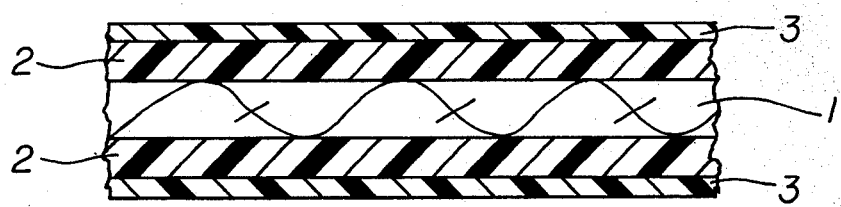
FIG. 2 is a cross-section of a silicone elastomer-coated cloth having silicone resin on the surface produced by the method of this invention.

To explain this based on the figures, in FIG. 2, 1 is the cloth, 2 is the silicone elastomer, and 3 is the silicone resin layer with a molar ratio of organic groups to silicon atoms of 0.8 to 1.8.

Cloth 1 imparts strength and dimensional stability. In terms of materials, inorganic fibers such as glass fibers, carbon fibers, silicon carbide fibers, and stainless steel fibers, synthetic fibers such as nylon, polyethylene terephthalate, polyacrylonitrile, polyvinyl alcohol, polypropylene, polyvinylidene chloride, and rayon acetate, and natural fibers such as cotton and linen can all be used. As far as the manufacturing methods go, textiles, knits, unwoven cloth, and meshes are all usable. From the standpoint of light permeability, glass fibers and transparent synthetic fibers are preferable. From the standpoint of weather resistance, inorganic fibers such as glass fibers, carbon fibers, silicon carbide fibers, stainless steel fibers, polyethylene terephthalate fibers, and polyvinyl alcohol fibers are preferable. The thickness of the cloth is not particularly limited so long as pliability is retained.

The silicone elastomer 2 imparts waterproofing, windproofing, and elasticity and prevent fraying of the cloth. Examples of addition-reaction-curing types of silicone elastomer compositions are those which use a platinum system catalyst, i.e., those compositions which can be cured, consisting mainly of diorganopolysiloxane having silicon atom-bonded alkenyl groups, organohydrogenpolysiloxane, a platinum system catalyst, optionally reinforcing fillers, and other additional ingredients such as extending fillers, addition-reaction retardants, heat proofing agents, flame proofing agents, pigments, etc.

Here, examples of the polydiorganosiloxanes which contain silicon atom-bonded unsaturated groups are polydimethylsiloxane liquid with both ends of the chain terminated with dimethylvinylsiloxy units, liquid or gum copolymers of dimethylsiloxane units and methylvinylsiloxane units with both ends of the chain terminated with dimethylvinylsiloxy units, liquid or gum copolymers of dimethylsiloxane units and methylphenylsiloxane units with both ends of the chain terminated with methylphenylvinylsiloxy units, liquid or gum copolymers of dimethylsiloxane units and methylvinylsiloxane units with both ends of the chain terminated with dimethylvinylsiloxy units, liquid methyl (3,3,3-trifluoropropyl)polysiloxane with both ends of the chain terminated with dimethylvinylsiloxy units and gum copolymer of dimethylsiloxane units and methylvinylsiloxane units with both ends of the chain terminated by silanol groups.

Examples of the polyorganohydrogensiloxanes are polymethylhydrogensiloxane liquid with both ends of the chain terminated with trimethylsiloxy units, polymethylhydrogensiloxane liquid with both ends of the chain terminated by monohydrogendimethylsiloxy units, liquid copolymer of dimethylsiloxane units and methylhydrogensiloxane units with both ends of the chain terminated by trimethylsiloxy units, liquid copolymer of methylphenylsiloxane units and methylhydrogensiloxane units with both ends of the chain terminated with dimethylphenylsiloxy units and tetramethyltetrahydrogencyclotetrasiloxane.

Examples of the platinum system catalyst are platinum black, chloroplatinic acid, platinum tetrachloride, a complex of chloroplatinic acid and low molecular weight olefin, platinum bis(acetylacetonate), and rhodium catalysts.

Examples of the reinforcing filler are fumed silica, fumed silica treated for hydrophobicity, precipitated silica, precipitated silica treated for hydrophobicity, and carbon black.

Examples of the organic peroxide-cured type of silicone elastomer are compositions with polydiorganosiloxane, reinforcing filler and organic peroxide as the main components and optionally containing extending fillers, heatproofing agents, flameproofing agents, pigments, and organic solvents.

Examples of the polydiorganosiloxanes are gums of polydimethylsiloxane, dimethylsiloxane-methylphenylsiloxane copolymer, dimethylsiloxane-diphenylsiloxane copolymer, dimethylsiloxane-methylvinylsiloxane copolymer, dimethylsiloxane-methylphenylsiloxane-methylvinylsiloxane copolymer, and methyl(3,3,3-trifluoropropyl)siloxanemethylvinylsiloxane copolymer as the main chain and with both ends of the chain terminated with trimethylsiloxy units, dimethylvinylsiloxy units, methylphenylvinylsiloxy units, or silanol groups.

Examples of the reinforcing fillers are the same as the examples given above.

Examples of the organic peroxides are benzoyl peroxide, p-chlorobenzoyl peroxide, dicumyl peroxide, di-t-butyl peroxide, and 2,5-dimethyl-2,5-di(t-butylperoxy)hexane.

The examples of silicone elastomers given above are well known in the art.

The degree of hardness of the silicone elastomer 2 should be 20–72 when measured with the JIS K 6301 hardness meter A. When it is less than 20, the silicone elastomer-coated cloth lacks a feeling of elasticity. When it is more than 72, the silicone elastomer-coated cloth becomes rigid.

The thickness of the silicone elastomer 2 is not critical. However, the lower limit is the level at which the protruding parts of the cloth are not exposed and the upper limit should be such as to maintain the pliability of the silicone elastomer-coated cloth.

The silicone resin layer 3 shown in FIG. 2 adheres to or is integrated with the silicone elastomer 2. Its function is to impart soil resistance without impairing the pliability of the silicone elastomer 2.

The silicone resins contain siloxane units selected from the group consisting of

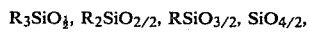

$R_3SiO_{\frac{1}{2}}$, $R_2SiO_{2/2}$, $RSiO_{3/2}$, $SiO_{4/2}$, where R is an organic radical such as methyl radical, phenyl radical, vinyl radical or hexyl radical. These resins are silanol group-containing polyorganosiloxane resins. The molar ratio of R per silicon atom for the polyorganosiloxane resin is 0.8 to 1.8.

The addition-reaction-curing type of silicone resin composition is a group of compositions made primarily of polyorganosiloxane resins containing silicon atom-bonding lower alkenyl groups, such as vinyl groups and allyl groups, polyorganohydrogensiloxane, and a platinum system catalyst, which are cured.

When the molar ratio of organic groups to silicon atoms in the silicone resin is less than 0.8, cracks occur readily during bending. When it is greater than 1.8, the soil resistance is lessened. From such a viewpoint, the molar ratio of organic groups to silicon atoms is preferably 1.2 to 1.7.

Examples of the polyorganohydrogensiloxanes and platinum system catalysts are the same as those given above.

The thickness of the silicone resin layer 3 is not particularly limited so long as it does not impair the pliability of the silicone elastomer-coated cloth. Preferably, it is 0.5–300 micrometers. It is technically difficult to produce one less than 0.5 micrometer. When it is greater than 300 micrometers, the silicone elastomer-coated cloth as a whole tends to become rigid.

In the present invention, "silicone resin" means a cured resin and "silicone resin composition" means the composition before curing.

For the silicone elastomer-coated cloth of the present invention, the cloth is first coated with the silicone elastomer composition, and the silicone resin composition is coated onto this silicone elastomer composition, after which the silicone elastomer composition and silicone resin composition are cured simultaneously.

In the manufacture of this, dirt and foreign objects should be eliminated from the cloth by scouring or degreasing washes. Furthermore, pretreatment with an organoalkoxysilane system primer is also desirable in that it enhances the adhesiveness to the silicone elastomer cloth.

A particular method of coating the silicone elastomeric composition onto the cloth is matched with the nature of the composition and is selected from calendering, knife coating, brush painting, dip coating, and spraying. Calendering is appropriate when the silicone elastomer composition is solid. When it is liquid, knife coating, brush painting, dip coating, or spraying are suitable.

Brush painting, knife coating, dip coating or spraying are appropriate for coating the silicone resin composition onto the silicone elastomer composition. Brush painting, dip coating or spraying are suitable for coating onto a solid silicone elastomer composition. Spraying is suitable for coating on top of a liquid silicone elastomer composition.

Suitable conditions for curing the silicone elastomer composition and silicone resin composition are selected according to their curing mechanism. When it is of the addition-reaction-curing type, which uses a platinum system catalyst, hot air vulcanization (e.g., 100°–400° C. for several tens of minutes to several seconds) is suitable. When it is of the radical-reaction-curing type, which uses an organic peroxide catalyst, hot air vulcanization (e.g., 150°–550° C. for 20 minutes to several seconds) is suitable.

Heat curing is used for curing the silicone resin composition. When the cloth is coated with an addition-reaction-curing type of silicone elastomer composition, which uses a platinum system catalyst, or an organic peroxide-curing type of silicone elastomer composition, and an addition-reaction-curing type of silicone resin composition, which uses a platinum system catalyst, is coated onto this silicone elastomer composition and then this silicone elastomer composition and silicone resin composition are heat cured simultaneously, a silicone elastomer-coated cloth with a silicone resin layer 3 integrated with a silicone elastomer 2 can be manufactured efficiently.

Because the silicone elastomer-coated cloth obtained in this way is pliable and has excellent bending resistance and soil resistance, it can be used for an exterior material for buildings, e.g., air membrane structure materials, exterior materials for gymnasiums and garages, tents, tarpaulins, ski wear, mountain climbing wear, raincoats, and conventional industrial materials.

When glass fiber textiles with a large void fraction or transparent synthetic fiber textiles are selected as the cloth 1, colorless, transparent-semitransparent silicone elastomer is selected as the silicone elastomer 2 and colorless, transparent-semitransparent silicone resin is selected as the silicone resin 3, the silicone elastomer-coated cloth has excellent light permeability and is suited as an exterior material for buildings requiring light and as greenhouse materials.

Examples of the present invention are given below. In the examples, "parts" means "parts by weight." The physical property values are values measured according to JIS K 6301. The viscosity is the value measured at 25° C.

EXAMPLE 1

A material was obtained by mixing 100 parts of a gum copolymer of 94.8 mol percent dimethylsiloxane units, 5 mol percent methylvinylsiloxane units, and 0.2 mol percent methylvinylsiloxane units, with both ends of the chain terminated by methylphenylvinylsiloxy units, 30 parts of fumed silica with a relative surface area of 300 m$^2$/g, 8.0 parts of hexamethyldisilazane, and 2.0 parts of water while heating. A silicone elastomer composition was then obtained by adding 3.5 parts of 50 percent by weight 2,4-dichlorobenzoyl peroxide paste to this material and mixing until homogenous.

Next, this silicone elastomer composition was thinly coated onto both sides of a previously washed glass fiber textile (flat weave, weave density 18×17 fibers/25 mm, weight 405 g/m$^2$, thickness 0.37 mm) by calendering.

Next, an addition-reaction-curing type of silicone resin composition (viscosity 1.27×10$^{-3}$ square meters per second) made of 100 parts of organopolysiloxane resin composition (molar ratio of organic groups to silicon atoms of 1.7) composed of 30 mol percent dimethylsiloxane units, 50 mol percent monophenylsiloxane units and 20 mol percent dimethylvinylsiloxane units, 2.1 parts of a copolymer of 50 mol percent dimethylsiloxane units, and 50 mol percent methylhydrogensiloxane units with both ends of the chain terminated by dimethylphenylsiloxy units, 0.05 part of benzotriazole in propyl alcohol, and 0.003 part of chloroplatinic acid (H$_2$PtCl$_6$.6H$_2$O) was introduced into a 180° C. hot air furnace while being sprayed thinly onto the above silicone elastomer composition-coated glass fiber textile. It was then vulcanized and cured by heating for 20 minutes to obtain a silicone elastomer-coated glass fiber textile thinly coated with a silicone resin layer. The thickness of the silicone resin layer was 60 micrometers and the thickness of the whole was 0.80 mm. The degree of hardness of the silicone elastomer alone was 37. This is coated cloth A.

The silicone elastomer-coated glass fiber textile obtained in this way was permeable to light and pliable. Even upon being rubbed 1,000 times with a Scott rubbing test apparatus using petroleum jelly as the lubricant, no peeling occurred between the silicone resin layer and the silicone elastomer layer or between the silicone elastomer layer and the glass fiber textile.

As a comparative example, a glass fiber textile coated only with the above silicone elastomer composition was introduced into a 180° C. hot air furnace and vulcanized by heating for 20 minutes to obtain a silicone elastomer-coated glass fiber textile. This is coated cloth B.

Next, the silicone elastomer-coated glass fiber textile that was thinly coated with a silicone resin layer, coated cloth A, and the silicone elastomer-coated glass fiber textile that was not coated with a silicone resin layer, coated cloth B, were exposed outdoors. The silicone elastomer-coated glass fiber textile which was coated with a silicone resin layer, coated cloth A, scarcely became soiled even after one year and the small amounts of dust which adhered to the surface could be removed just by wiping lightly. However, the silicone elastomer-coated glass fiber textile that was not coated with a silicone resin layer, coated cloth B, became soiled after one month and the large amounts of dust which adhered to the surface could not be removed, even by wiping.

EXAMPLE 2

A silicone elastomer composition made by homogenously mixing 100 parts of liquid polydimethylsiloxane with both ends of the chain terminated by methylphenylvinylsiloxy units (viscosity 2×10$^{-3}$ square meters per second), 3.0 parts of a copolymer of dimethylsiloxane units and methylhydrogensiloxane units with both ends of the chain terminated with trimethylsiloxy units (viscosity 2×10$^{-5}$ square meters per second), 0.3 part of a complex of platinum and tetramethyldivinyldisiloxane (platinum content 0.5 percent by weight), 15 parts of fumed silica with a relative surface area of 130 m$^2$/g which had been treated for hydrophobicity with trimethylsilyl groups and 0.50 part of methylbutynol was coated on one side of a polyethylene terephthalate fiber textile (flat weave, weave density 29×28 fibers/25 mm, weight 247 g/m$^2$, thickness 0.25 mm) which had been pretreated with a primer composed mainly of vinyltrimethoxysilane and tetrabutylorthotitanate, by the knife coating method.

Next, an addition-reaction-curing type of silicone resin composition made of 100 parts of organopolysiloxane resin (molar ratio of organic groups to silicon atoms of 1.3) composed of 10 mol percent dimethylsiloxane units, 80 mol percent monomethylsiloxane units, and 10 mol percent dimethylvinylsiloxane units, 11 parts of tetramethyltetrahydrogencyclotetrasiloxane, 0.52 part of a complex of platinum and tetramethyldivinyldisiloxane (platinum content 0.6 percent by weight), 0.8 part of methylbutynol and 50 parts of xylene was introduced into a 150° C. hot air furnace while being sprayed thinly on top of the above silicone elastomer composition-coated polyethylene terephthalate fiber textile and vulcanized and cured for 10 minutes to obtain a silicone elastomer-coated polyethylene terephthalate fiber textile thinly coated with a silicone resin layer. The reverse side of the polyethylene terephthalate fiber textile was also coated with silicone elastomer and silicone resin in the same way.

The thickness of the silicone resin layer of the silicone elastomer-coated polyethylene terephthalate fiber textile obtained in this way was 36 micrometers. The thickness of the whole was 0.85 mm. The degree of hardness of the silicone elastomer alone was 32. This is coated cloth C.

This silicone elastomer-coated polyethylene terephthalate fiber textile was permeable to light and pliable. Even when rubber 1,000 times with a Scott rubbing test apparatus with petroleum jelly as the lubricant, no peeling occurred between the silicone resin layer and the silicone elastomer layer or between the silicone elastomer layer and the polyethylene terephthalate fiber textile.

As a comparative example, a polyethylene terephthalate fiber textile coated only with the above silicone elastomer composition was introduced into a 150° C. hot air furnace and vulcanized by heating for 10 minutes to obtain a silicone elastomer-coated polyethylene terephthalate fiber textile. Its reverse side was also coated with silicone elastomer in the same way. This is coated cloth D.

Next, the silicone elastomer-coated polyethylene terephthalate fiber textile that was thinly coated with a silicone resin layer, coated cloth C, and the silicone elastomer-coated polyethylene terephthalate fiber textile that was not coated with a silicone resin layer, coated cloth D, were exposed outdoors. The silicone elastomer-coated polyethylene terephthalate fiber textile that was coated thinly with a silicone resin layer, coated cloth C, scarcely became soiled even after one year and the small amount of dust that adhered to the surface could be removed just by wiping lightly. However, the silicone elastomer-coated cloth that was not coated with a silicone resin layer, coated cloth D, became soiled after one month and the large amounts of dust which adhered to the surface could not be removed even by wiping.

EXAMPLE 3

Except that a carbon fiber textile (flat weave, weave density 14×13 fibers/25 mm, weight 340 g/m², thickness 0.78 mm) that was washed beforehand was used instead of the polyethylene terephthalate fiber textile that was pretreated with a primer composed mainly of vinyltrimethoxysilane and tetrabutylorthotitanate as in Example 2, a silicone elastomer-coated carbon fiber textile thinly coated with silicone resin layer was obtained under the same conditions as in Example 2.

The thickness of the silicone resin layer of the silicone elastomer-coated carbon fiber textile obtained in this way was 41 micrometers. The thickness of the whole was 1.4 mm. This silicone elastomer-coated carbon fiber textile was pliable and possessed excellent bending resistance and soil resistance.

That which is claimed is:

1. A method of manufacturing a silicone elastomer-coated cloth having a layer of silicone resin over silicone elastomer consisting essentially of coating a cloth with silicone elastomer composition of a type selected from the group consisting of an addition-reaction-curing type using a platinum catalyst and an organic peroxide-curing type, after which a silicone resin composition of the addition-reaction-curing type using a platinum catalyst and having a molar ratio of organic groups to silicon atoms of 0.8 to 1.8 is coated over the surface of the silicone elastomer composition and then the said silicone elastomer composition and the said silicone resin composition are simultaneously heat cured.

2. The method of claim 1 in which the cloth is coated with an addition-reaction-curing silicone elastomer composition.

3. The method of claim 1 in which the cloth is coated with an organic peroxide-curing silicone elastomer composition.

4. The method of claim 2 in which the silicone resin composition has a molar ratio of organic groups to silicon atoms of from 1.2 to 1.7.

5. The method of claim 3 in which the silicone resin composition has a molar ratio of organic groups to silicon atoms of from 1.2 to 1.7.

6. The method of claim 1 in which the cloth is made of glass fibers.

7. The method of claim 1 in which the cloth is made of polyethylene terephthalate fibers.

8. The method of claim 1 in which the cloth is made of carbon fibers.

9. The method of claim 4 in which the cloth is made of glass fibers.

10. The method of claim 5 in which the cloth is made of glass fibers.

11. The method of claim 1 in which the cured silicone resin has a thickness of between 0.5 and 300 micrometers.

12. The method of claim 1 in which the cured silicone resin has a thickness of between 10 and 100 micrometers.

* * * * *